United States Patent [19]

Espadamala

[11] Patent Number: 6,069,657
[45] Date of Patent: May 30, 2000

[54] TELEVISION SIMULATOR FOR DST TRANSFORMERS

[75] Inventor: Ramon Romero Espadamala, Sant Hipolit De Voltrega, Spain

[73] Assignee: Diemen, S.A., De Voltrega, Spain

[21] Appl. No.: 08/955,763

[22] Filed: Oct. 22, 1997

[30] Foreign Application Priority Data

Oct. 28, 1996 [ES] Spain ..................................... 9602268

[51] Int. Cl.[7] ................................................. H04N 17/04
[52] U.S. Cl. .......................... 348/180; 348/184; 348/189
[58] Field of Search .................................... 348/180, 181, 348/184, 189; H04N 17/04

[56] References Cited

U.S. PATENT DOCUMENTS

| | | | |
|---|---|---|---|
| 3,934,194 | 1/1976 | Paprocki | 324/51 |
| 4,829,239 | 5/1989 | Holstein | 324/117 H |
| 5,350,979 | 9/1994 | Kropuenske et al. | 315/411 |
| 5,677,731 | 10/1997 | Kato | 348/177 |

FOREIGN PATENT DOCUMENTS 870477 3/1996 Japan .............................. H04N 17/04

OTHER PUBLICATIONS

Copy of European Search Report.

*Primary Examiner*—Sherrie Hsia
*Attorney, Agent, or Firm*—Steinberg, Raskin & Liberchuk, P.C.

[57] ABSTRACT

A television simulator for DST transformers including a hood which is intended to be connected to a cathode ray tube of a television set. The television simulator further includes a first power supply connected to one of the terminals of the primary of the DST transformer for supplying power and a unit for simulating the final line stage of the television set. The unit for simulating the final line stage of the television set presents a first input signal from a microprocessor, a second input signal from the other terminal of the primary of the DST transformer, and first and second error output signals towards the microprocessor. The television simulator further includes a control unit for a display screen, the control unit receiving a signal from the microprocessor and also providing an output signal towards said display screen. The television simulator also includes a voltage divider unit which is connected to the hood of the DST transformer and which has an output signal towards the microprocessor and a second power supply, such that the display screen shows, when the transformer is functioning incorrectly, the type of failure which exists, and, when the transformer is functioning correctly, the proportional voltage supplied by the DST transformer.

11 Claims, 2 Drawing Sheets ure 6,069,657

TELEVISION SIMULATOR FOR DST TRANSFORMERS

The present invention relates to a television simulator, for DST transformers which comprise a hood for connection of the transformer to a cathode ray tube; it allows to check the correct functioning of the transformers without mounting them in a television set.

DST (Diode-Split Transformer) transformers are used for the power supply of cathode ray tubes of television sets.

BACKGROUND OF THE INVENTION

Known in the art are devices for checking on the correct functioning of DST transformers.

Such devices have the disadvantage that they do not perform the measurement of the Very High Voltage (VHV) and do not perform the function as a real stage of horizontal deflection.

Moreover, failure indication is implemented by a light-emitting diode (LED), which does not allow a differentiation between the possible errors which lead to poor functioning of the DST transformer.

This means that it is not possible to determine the type of failure, and this does not ensure speedy diagnosis of the possible failure.

Furthermore, said devices do not detect lower VHV levels for cathode ray tubes, which lead to poor functioning of said tubes, since the power needed for the correct operation of the cathode ray tubes is higher than the power supplied by the DST transformer.

DESCRIPTION OF THE INVENTION

The television simulator of the present invention solves the disadvantages outlined, while also providing other advantages which will be described below.

The television simulator for DST transformers is characterized in that it comprises a first power supply connected to one of the terminals of the primary of the DST transformer for power supply thereof; a unit for simulating the final line stage of the television set, which presents a first input signal from a microprocessor, a second input signal from the other terminal of the primary of the DST transformer, first and second error output signals towards the microprocessor. It also includes a control unit for a display screen, said control unit receiving a signal from the microprocessor and also providing an output signal towards the display screen; a voltage divider unit which is connected to the hood of the DST transformer and has an output signal towards the microprocessor; and a second power supply; such that the display screen shows, when the transformer is functioning incorrectly, the type of failure which exists, and, when the transformer is functioning correctly, the proportional voltage supplied by the DST transformer.

It is thereby possible to check whether the DST transformer is functioning perfectly without having to mount it in a television set. Furthermore, if a failure occurs, the simulator indicates the type of failure which has occurred and therefore greatly facilitates diagnosis of the failure in the DST transformer.

Preferably, the unit for simulating the final line stage of the television set includes a capacitor connected in parallel to a diode, while both are in turn connected to the collector of a transistor, which is in turn connected, at its base, to the microprocessor through a resistor, at its emitter to a resistor and to the second error signal which allows the microprocessor to detect an excess current, and also, at its collector, to the first error signal which allows detection of incorrect wave shapes.

The voltage divider unit includes a plurality of resistors in series.

A low voltage output signal is thus provided which is proportional to the high-voltage signal which is generated inside the VHV transformer (DST).

Mainly, between the voltage divider unit and the microprocessor there are a first operational amplifier and a resistor.

Also between the first error signal and the microprocessor there is a second operational amplifier, and between the second error signal and the microprocessor there is a third operational amplifier.

The use of operational amplifiers is due to the need to make the signals suitable for use by the microprocessor.

According to one characteristic of the invention, the simulator includes a light-emitting diode (LED) which shows the existence of a failure.

According to another characteristic of the invention, the display screen includes a first error-indicating digit.

If a failure occurs during checking of the transformer, the first digit indicates the type of failure in the transformer and the location of said failure.

Moreover, the display screen has three further digits to indicate the voltage measured at the output of the voltage divider unit.

Said digits indicate the voltage measured only if no failure arises during checking of the DST transformer. Moreover, the voltage measured is given in a kV scale with one decimal.

The television simulator includes means for connection of the hood of the DST transformer.

Furthermore, the television simulator has a switch for 90° and 110° cathode ray tubes.

Said switch is necessary in order to make the television simulator compatible with any of the possible cathode ray tube options. Thus, 90° cathode ray tubes encompass 14, 20 and 21 inch television sets, while 110° cathode ray tubes encompass televisions of larger dimensions.

BRIEF DESCRIPTION OF THE DRAWINGS

For a better understanding of all that has been outlined some drawings are attached in which, schematically and solely by way of non-restrictive example, a practical case of embodiment is shown.

In said drawings.

DESCRIPTION OF A PREFERRED EMBODIMENT

Figure 1:
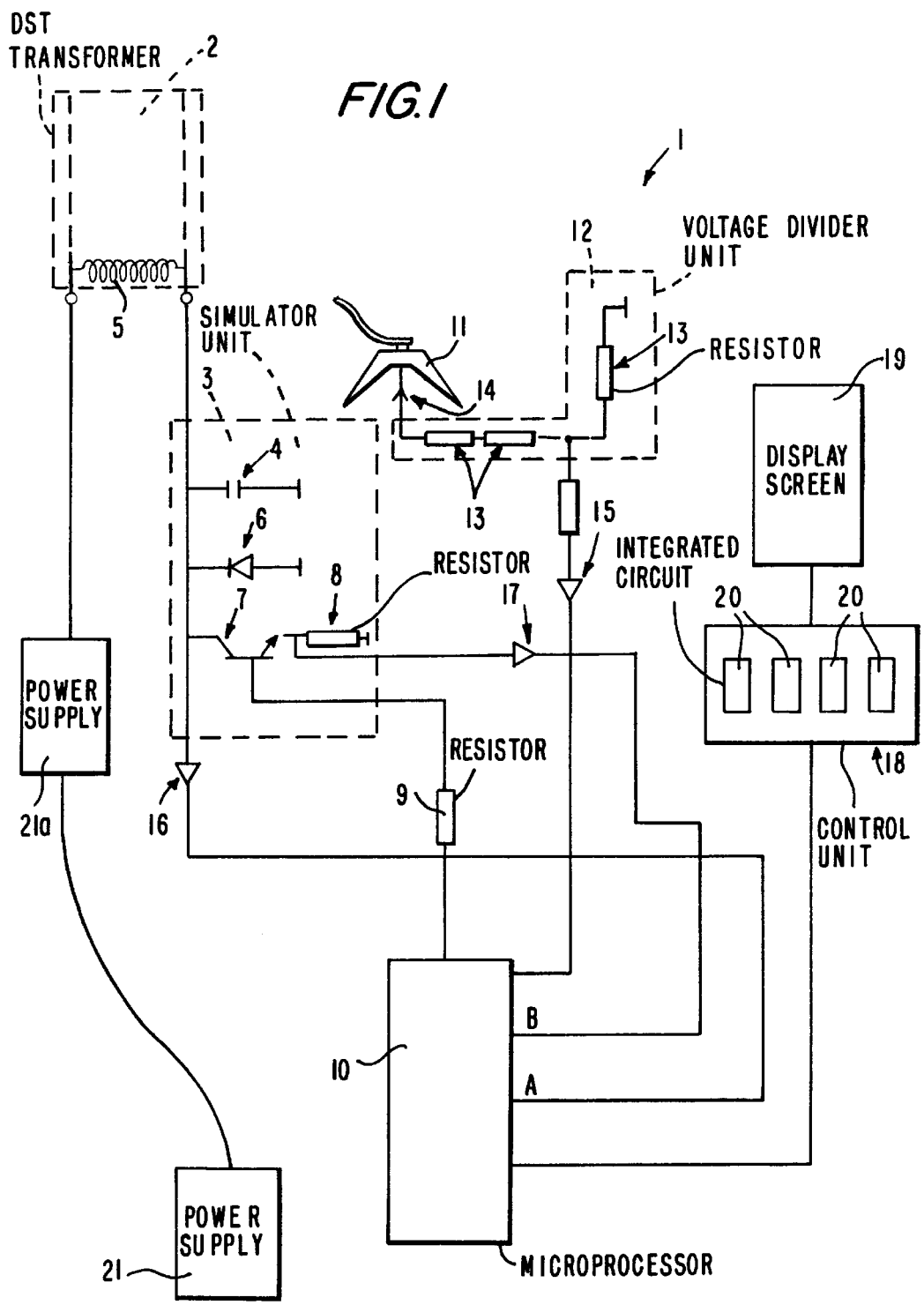
FIG. 1 is a block diagram of the television simulator for DST transformers which is the object of the invention.

As can be seen in FIG. 1, the television simulator 1 for DST transformers 2 has a simulator unit 3 for simulating the final line stage of a television set, which includes a capacitor 4, connected to one of the terminals of the primary 5 of the DST transformer, and arranged in parallel with a diode 6, whose anode is connected to the collector of a bipolar transistor (BJT) 7, whose emitter has a resistor 8 connected to earth. The base of the transistor is connected to a line frequency pulse generator unit (microprocessor 10) through a resistor 9, said pulse generator making the transistor 7 work in switching mode. The microprocessor 10, which in turn receives as input a low-voltage signal, proportional to the high-voltage signal present in the hood 11 of the DST transformer 2, obtained from the measurement at a voltage divider unit 12. Said unit has a plurality of resistors 13 in series, said resistors having, also in series, the connector 14 for the hood 11 of the DST transformer 2. Between said voltage divider unit 12 and the microprocessor 10 there is, for reasons of impedance, an operational amplifier 15 (to make the obtained signal suitable for the characteristics of the microprocessor).

The microprocessor 10 also receives an input of the measurement taken at the collector of the transistor 7, (first error output signal A) with a second operational amplifier 16 being arranged between said collector and the microprocessor 10, also for reasons of impedance. Moreover, the microprocessor 10 also receives the input of the signal obtained at the emitter of the bipolar transistor 7 (second error output signal B), with a third operational amplifier 17 being arranged between said emitter and the microprocessor 10.

On the other hand, the microprocessor 10 has an output to a control unit 18 of a liquid crystal display screen 19 (LCD), by means of which it is possible to obtain readings of the high voltage supplied by the DST transformer 2, in order to check that it is functioning correctly. The control unit 18 of the display screen 19 includes four integrated circuits 20, each for controlling one of the digits.

The television simulator 1 also includes a power supply 21 which supplies a 5 V voltage for the electronic components such as the microprocessor 10 and operational amplifiers 15, 16 and 17, and a 12 V voltage 21a to supply the primary 5 of the DST transformer 2.

Figure 2:
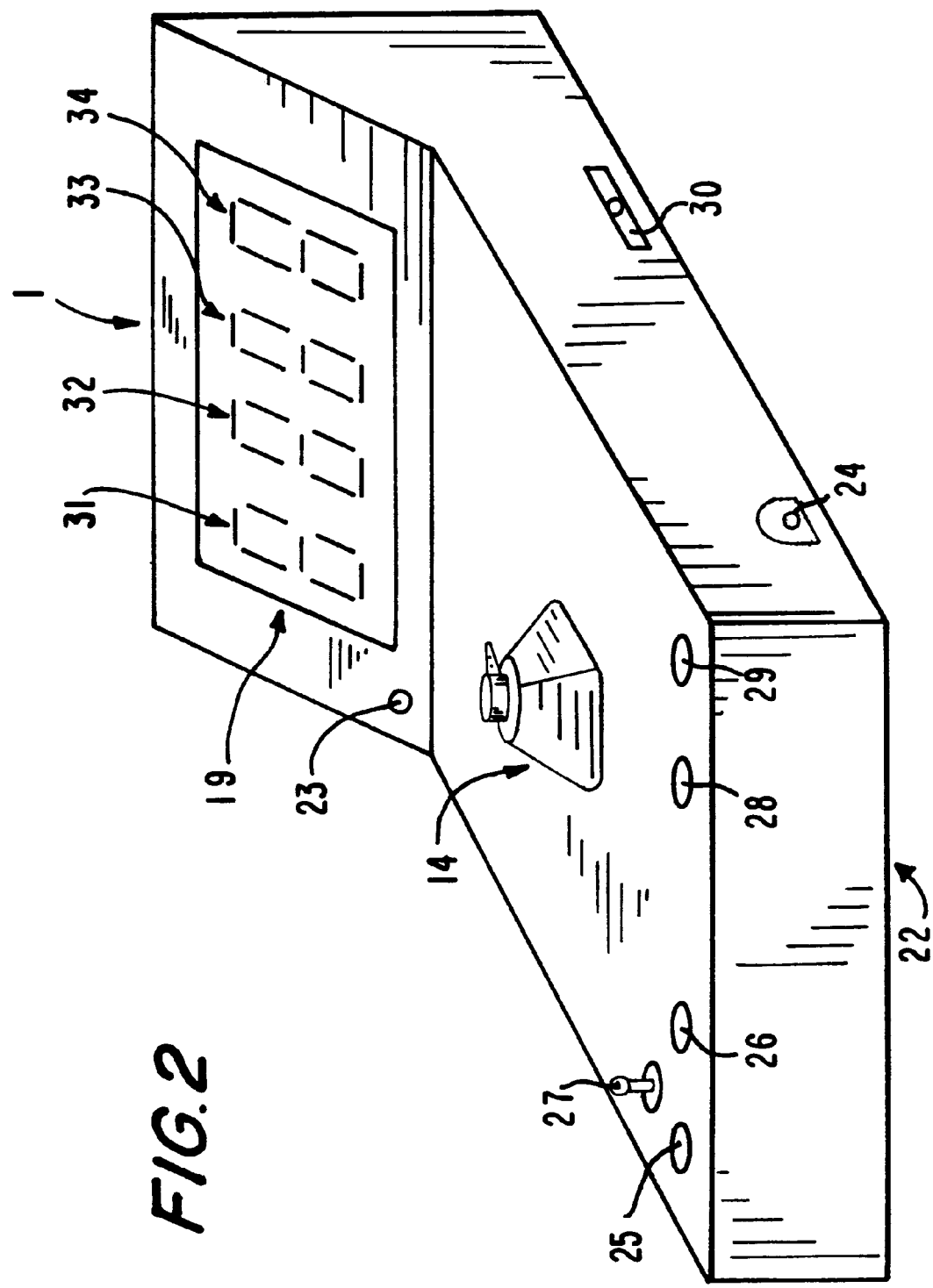
FIG. 2 is a perspective view of the television simulator of FIG. 1.

As can be appreciated from FIG. 2, the television simulator 1 for DST transformers 2 (Diode-Split Transformer) also includes a casing 22, preferably made of plastic, a light-emitting diode 23 to indicate failure of the checked DST transformer 2, a connector 24 for the power supply 21, a connector 14 for the hood 11 of the high-voltage cable of the DST transformer 2, a pair of terminals 25,26 for connection of the primary 5 of the DST transformer and through which it possible to make measurements, a terminal 27 for connection of a probe or oscilloscope, a pair of earth connection terminals 28,29, and a switch 30 to switch between 90° and 110° versions of cathode ray tubes.

The liquid crystal display screen 19 has a first digit 31 to indicate the type of error occurring during checking of the DST transformer 2. Said first digit 31 can have the following values:

1: display of this value indicates a tolerance error in the current, that is, the current of the transistor 7 is too high, probably due to a short circuit in the primary 5 of the transformer 2. Said error is detected by the microprocessor 10 through the input of the signal obtained at the emitter of the transistor, which has been described above.

2: display of this value indicates that the high-voltage reading obtained is below a preset value, so that the DST transformer 2 is not working correctly. Said error is detected by the microprocessor 10 through the input of the signal obtained at the voltage divider unit 12, which has been described above.

3: Display of this value indicates that a failure has arisen in one of the windings of the DST transformer 2. Said error is detected by the microprocessor 2 through the input of the signal obtained at the collector of the transistor 7, which has also been described above.

The display screen 19 also presents three digits 32,33,34 to show the high-voltage value measured, in case that no error of the types mentioned above has ocurred. These digits provide the value measured in kilovolts, with one decimal.

The functioning of the television simulator 1 is thus as follows.

The hood 11 of the DST transformer 2 must first be connected to the connector 14 provided for this purpose on the casing 22 of the simulator 1. The earth terminals of the simulator are then connected to the corresponding terminals of the DST transformer, following connection of the primary winding to the terminals. Once the connections have been made, the simulator is switched on; if the transformer 2 is working correctly the display screen 19 shows the high-voltage value, while if it is not working correctly it will show the reading of the error which has occurred during checking of the transformer 2.

Despite the fact that reference has been made to specific embodiments of the invention, it will be obvious to to the skilled man that many variations and modifications may be made to the television simulator described, and that all the details mentioned can be replaced by others which are technically equivalent, without departing from the scope of protection defined by the attached claims.

What is claimed is:

1. Television simulator, for DST transformers which comprise a hood which is intended to be connected to a cathode ray tube of a television set, comprising a first power supply connected to one of the terminals of the primary of the DST transformers for power supply thereof; a unit for simulating the final line stage of the television set which presents a first input signal from a microprocessor, a second input signal from the other terminal of the primary of the DST transformers, first and second error output signals towards the microprocessor; a control unit for a display screen, said control unit receiving a signal from the microprocessor and also providing an output signal towards said display screen; a voltage divider unit which is connected to the hood of the DST transformers and has an output signal towards the microprocessor; and a second power supply; such that the display screen shows, when the transformer is functioning incorrectly, the type of failure which exists, and, when the transformer is functioning correctly, the proportional voltage supplied by the DST transformers.

2. Television simulator as claimed in claim 1, wherein the unit for simulating the final line stage of the television set includes a capacitor connected in parallel to a diode, while both are in turn connected to the collector of a transistor, which is in turn connected, at the base of the transistor, to the microprocessor through a resistor, at the emitter of the transistor to a resistor and to the second error signal which allows the microprocessor to detect an excess current, and also, at the collector of the transistor, to the first error signal which allows detection of incorrect wave shapes.

3. Television simulator as claimed in claim 1 wherein the voltage divider unit includes a plurality of resistors in series.

4. Television simulator as claimed in claim 1, wherein between the voltage divider unit and the microprocessor there are a first operational amplifier and a resistor.

5. Television simulator as claimed in claim 1, wherein between the first error signal and the microprocessor there is a second operational amplifier.

6. Television simulator as claimed in claim 1, wherein between the second error signal and the microprocessor there is a third operational amplifier.

7. Television simulator as claimed in claim 1, further comprising a light-emitting diode (LED) which shows the existence of a failure.

8. Television simulator as claimed in claim 1, wherein the display screen includes a first error-indicating digit.

9. Television simulator as claimed in claim 8, wherein the display screen has three further digits to indicate voltage measured at the output of the voltage divider unit.

10. Television simulator as claimed in claim 1, further comprising means for connection of the hood of the DST transformers.

11. Television simulator as claimed in claim 1, further comprising a switch for 90° and 110° cathode ray tubes.

* * * * *